United States Patent
Kawamoto et al.

(10) Patent No.: US 11,889,039 B2
(45) Date of Patent: Jan. 30, 2024

(54) IMAGE READING APPARATUS AND IMAGE FORMING APPARATUS INCLUDING A BEING-CONVEYED DOCUMENT READING MODE AND A PLACED-DOCUMENT READING MODE

(71) Applicants: Kota Kawamoto, Kanagawa (JP); Yasunobu Youda, Kanagawa (JP)

(72) Inventors: Kota Kawamoto, Kanagawa (JP); Yasunobu Youda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/943,476

(22) Filed: Sep. 13, 2022

(65) Prior Publication Data
US 2023/0156134 A1 May 18, 2023

(30) Foreign Application Priority Data
Nov. 16, 2021 (JP) .................................. 2021-186499

(51) Int. Cl.
*H04N 1/04* (2006.01)
*H04N 1/10* (2006.01)
*H04N 1/031* (2006.01)

(52) U.S. Cl.
CPC ........... *H04N 1/1043* (2013.01); *H04N 1/031* (2013.01)

(58) Field of Classification Search
None
See application file for complete search history.

(56) References Cited

U.S. PATENT DOCUMENTS

| 5,610,731 A * | 3/1997 | Itoh ........................... H04N 1/12 399/206 |
| 5,734,483 A | 3/1998 | Itoh |
| 5,801,851 A * | 9/1998 | Sheng .................. H04N 1/1017 358/497 |
| 2002/0054380 A1* | 5/2002 | Takeuchi ............... H04N 1/031 358/498 |
| 2003/0142370 A1* | 7/2003 | Hanashi ............... H04N 1/1017 358/474 |

(Continued)

FOREIGN PATENT DOCUMENTS

| JP | 7-288656 | 10/1995 |
| JP | 2003-143377 | 5/2003 |
| JP | 2010-258543 | 11/2010 |

*Primary Examiner* — Dung D Tran
(74) *Attorney, Agent, or Firm* — Harness, Dickey & Pierce, P.L.C.

(57) ABSTRACT

An image reading apparatus includes a for-still-document contact glass serving as a reading face for a placed document, a for-moving-document contact glass serving as a reading face for a document conveyed by an automatic document feeder, and an optical scanner unit to move in a scanning range of the for-still-document contact glass back and forth in a sub-scanning direction to scan the document. The optical scanner unit moves to a scanning range of the for-moving-document contact glass and scans the document in a static manner when the document is conveyed in an automatic manner, and the optical scanner unit includes a contact image sensor, a carriage that holds the contact image sensor in a movable manner in the sub-scanning direction, and a pair of end sliders arranged on both ends of a plane facing the reading face in a longer-side direction of the optical scanner unit.

11 Claims, 5 Drawing Sheets

(56) References Cited

U.S. PATENT DOCUMENTS

| | | | |
|---|---|---|---|
| 2013/0335790 A1* | 12/2013 | Narai | H04N 1/0249 |
| | | | 358/497 |
| 2015/0156360 A1* | 6/2015 | Horiguchi | H04N 1/00599 |
| | | | 358/498 |
| 2015/0264216 A1* | 9/2015 | Uematsu | H04N 1/1061 |
| | | | 358/497 |
| 2015/0341515 A1 | 11/2015 | Youda et al. | |
| 2016/0212296 A1* | 7/2016 | Osakabe | H04N 1/00795 |
| 2017/0208197 A1* | 7/2017 | Osakabe | H04N 1/1043 |
| 2017/0208208 A1* | 7/2017 | Fujii | H04N 1/04 |
| 2018/0302530 A1* | 10/2018 | Inui | H04N 1/401 |
| 2020/0304676 A1* | 9/2020 | Watanabe | H04N 1/193 |

* cited by examiner

IMAGE READING APPARATUS AND IMAGE FORMING APPARATUS INCLUDING A BEING-CONVEYED DOCUMENT READING MODE AND A PLACED-DOCUMENT READING MODE

CROSS-REFERENCE TO RELATED APPLICATION

This patent application is based on and claims priority pursuant to 35 U.S.C. § 119(a) to Japanese Patent Application No. 2021-186499, filed on Nov. 16, 2021, in the Japan Patent Office, the entire disclosure of which is hereby incorporated by reference herein.

BACKGROUND

Technical Field

Embodiments of the present disclosure relate to an image reading apparatus and an image forming apparatus.

Background Art

Image reading apparatuses having two switchable modes are known in the art, and such two different modes of the image reading apparatuses include a being-conveyed document reading mode in which the image of a document is scanned and obtained while the document is being conveyed in an automatic manner and a placed-document reading mode in which the image of a document placed on a flat contact glass is scanned and obtained from below. As known in the art, such image reading apparatuses may be used as an image reading apparatus in an independent manner, or may be provided for an image forming apparatus such as a facsimile (FAX) machine, a copier, or a multifunction peripheral (MFP) having both a printer and a scanning function.

A method of reading an image using a contact image sensor (CIS) is known in the art. As the focal depth of a contact image sensor is shallow, the position of the contact image sensor relative to one or more contact glasses that serve as a document reading face needs to be determined with a high degree of accuracy.

In a typical configuration or structure known in the art with which the position of the contact image sensor is determined, both ends of an optical scanner unit provided with the contact image sensor are pressurized in an upward direction by a pressing member such as a spring, and the optical scanner unit is pressed against the bottom face of the contact glass through an abutment part that is also called a slider or a slide shoe.

SUMMARY

Embodiments of the present disclosure described herein provide an image reading apparatus including a for-still-document contact glass serving as a reading face for a placed document, a for-moving-document contact glass serving as a reading face for a document conveyed by an automatic document feeder, and an optical scanner unit to move in a scanning range of the for-still-document contact glass back and forth in a sub-scanning direction to scan the document. The optical scanner unit moves to a scanning range of the for-moving-document contact glass and scans the document in a static manner when the document is conveyed in an automatic manner, and the optical scanner unit includes a contact image sensor, a carriage that holds the contact image sensor in a movable manner in the sub-scanning direction, a pair of end sliders arranged on both ends of a plane facing the reading face in a longer-side direction of the optical scanner unit, and a pair of central sliders disposed in a center of longer-side direction. The pair of central sliders are disposed on both right and left sides of the contact image sensor in a moving direction of the optical scanner unit. When the optical scanner unit is at a home position before scanning operation starts, one of the pair of central sliders is at a position overlapping with the for-still-document contact glass when viewed in a vertical direction of the optical scanner unit.

BRIEF DESCRIPTION OF THE DRAWINGS

A more complete appreciation of embodiments and the many attendant advantages thereof will be readily obtained as the same becomes better understood by reference to the following detailed description when considered in connection with the accompanying drawings.

FIG. 8A illustrates a case in which there is no step on a reading face and FIG. 8B illustrates a case in which there is a step on the reading face.

Figure 1:
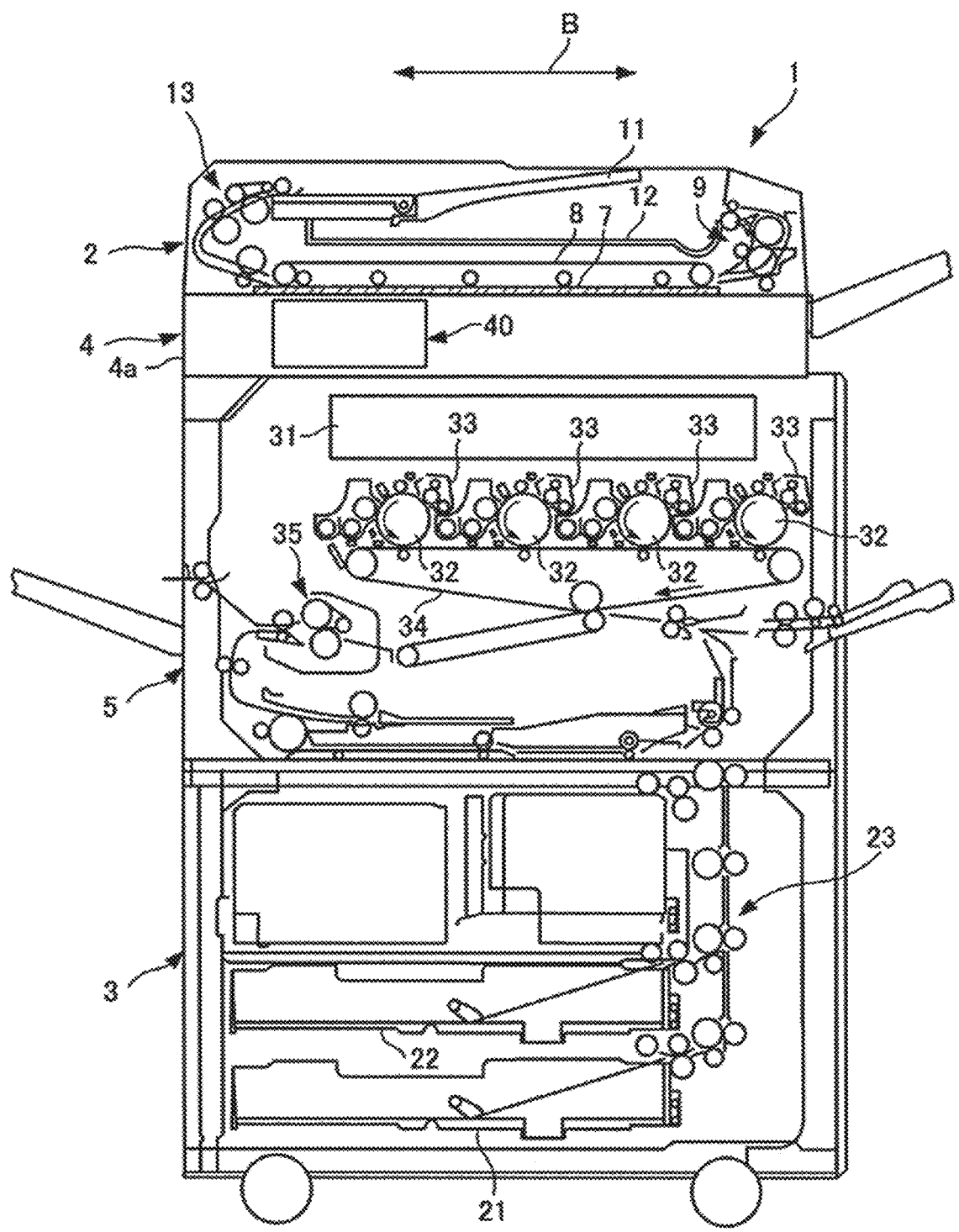
FIG. 1 is a schematic diagram illustrating a configuration of a color copier that serves as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

An image reading apparatus and an image forming apparatus according to an embodiment of the present disclosure are described below in detail with reference to the accompanying drawings. Embodiments of the present disclosure are described below, but the present disclosure is not limited to those embodiments and various applications and modifications may be made without departing from the scope of the disclosure.

FIG. 1 is a schematic diagram illustrating a configuration of a color copier 1 that serves as an image forming apparatus according to an embodiment of the present disclosure.

Figure 2:
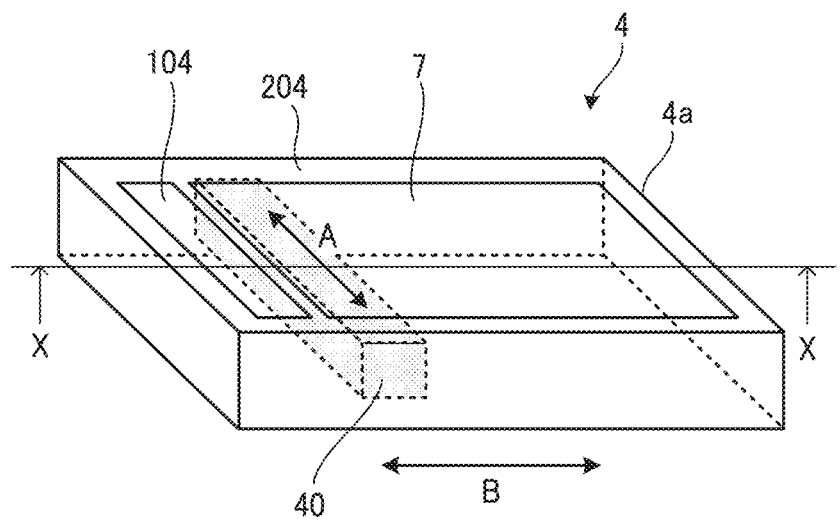
FIG. 2 is a perspective view of a scanner that serves as an image reading apparatus and makes up the color copier of FIG. 1, and illustrates an outline of the configuration of the scanner, according to the present embodiment.

FIG. 2 is a perspective view of a scanner 4 that serves as an image reading apparatus and makes up the color copier 1 of FIG. 1, and illustrates an outline of the configuration of the scanner 4, according to the present embodiment.

As illustrated in FIG. 1, the color copier 1 according to the present embodiment is provided with an automatic document feeder (ADF) 2, a sheet feeder 3, and a scanner 4 that serves as an image reading apparatus according to the present embodiment, and an image forming device 5.

The ADF 2 according to the present embodiment is provided with a first sheet tray 11 and a sheet feeder 13 composed of, for example, various kinds of rollers. The sheet feeder 13 separates a sheet of document from a bundle of sheets placed on the first sheet tray 11 on a one-by-one basis, and conveys the separated sheet of document toward a for-moving-document contact glass 104 that may be referred to as a document feeder (DF) contact glass in the following description.

Moreover, the ADF 2 according to the present embodiment is provided with a sheet ejection unit 9 composed of, for example, various kinds of rollers. Once the sheet of document placed on the document feeder contact glass 104 is scanned by an optical scanner unit 40 of the scanner 4, the sheet of document is ejected to the sheet tray 12 by the sheet ejection unit 9.

The ADF 2 is mounted on the scanner 4 in an openable and closable manner through an open and close mechanism such as a hinge.

The ADF 2 also serves as a document pressing unit that presses the document against the FB contact glass 7 for fixation when the optical scanner unit 40 moves in a sub-scanning direction indicated by an arrow B as illustrated in FIG. 1 and the document placed on the for-still-document contact glass 7 that may be referred to as an FB contact glass in the following description is scanned.

The FB contact glass 7 according to the present embodiment is arranged in an upper portion of a housing 4a of the scanner 4, and makes up the top face of the housing 4a.

As illustrated in FIG. 2, the scanner 4 according to the present embodiment is provided with the optical scanner unit 40 that serves as an image reading unit inside the housing 4a. The optical scanner unit 40 according to the present embodiment holds a light source and a contact image sensor (CIS) 200 whose main scanning direction is in the longer-side direction as indicated by an arrow A (see FIG. 2).

The optical scanner unit 40 according to the present embodiment goes and returns in the sub-scanning direction as indicated by an arrow B using a driver circuit provided for the scanner 4. As a result, a two-dimensional color image of the document placed on the FB contact glass 7 can be scanned and obtained. The FB contact glass 7 according to the present embodiment is arranged in an upper portion of a housing 4a of the scanner 4, and makes up the top face of the housing 4a.

The driver of the scanner 4 is composed of, for example, a wire fixed to the optical scanner unit 40, a plurality of driven pulleys and a driving pulley that are looped around the wire, and a motor that drives the driving pulley to rotate, and any known driver may be used as the driver of the scanner 4.

The sheet feeder 3 is provided with a sheet tray 21 and a sheet tray 22 that store a plurality of recording sheets or recording media with different sizes, and a sheet feed unit 23 that is composed of various kinds of rollers and conveys the multiple recording sheets stored in the sheet tray 21 and the sheet tray 22 to the position at which an image is to be formed by the image forming device 5.

The image forming device 5 according to the present embodiment is provided with an exposure device 31, a plurality of photoconductor drums 32, a plurality of developing devices 33 that is arranged around the multiple photoconductor drums 32 and has toner of various colors, a transfer belt 34, and a fixing device 35. The toner with various colors that is stored in the multiple developing devices 33 may be, for example, cyan (C) toner, yellow (Y) toner, magenta (M) toner, and black (BK) toner.

The image forming device 5 according to the present embodiment form an image on a plurality of photoconductor drums 32 based on the image data obtained by scanning an object by the optical scanner unit 40 of the scanner 4 and decomposing the image of the object into several different colors, and the toner images on the multiple photoconductor drums 32 are superimposed on top of one another and are primarily transferred onto the transfer belt 34. Then, the toner image on the transfer belt 34 is secondarily transferred onto a recording sheet fed from the sheet feeder 3. Subsequently, the toner on the toner image transferred to the recording sheet is fused or melted by the fixing device 35 to fix the color image on the recording sheet.

The color copier 1 according to the present embodiment may have a function to send the image read and obtained by an image transmitter and an image receiver to a destination device.

An image reading apparatus according to the present embodiment is described below.

As illustrated in FIG. 2, the image reading apparatus according to the present embodiment is provided with the for-still-document contact glass 7 that serves as a reading face for a placed document or an FB contact glass, the for-moving-document contact glass 104 that serves as a DF contact glass and a reading face for the document conveyed by the automatic document feeder (ADF) 2, and the optical scanner unit 40 that moves the scanning range of the for-still-document contact glass 7 back and forth in the sub-scanning direction to scan the document. When the sheet of document is conveyed in an automatic manner, the optical scanner unit 40 scans the sheet of document in a static manner upon moving to the scanning range of the for-moving-document contact glass 104.

Figure 3:
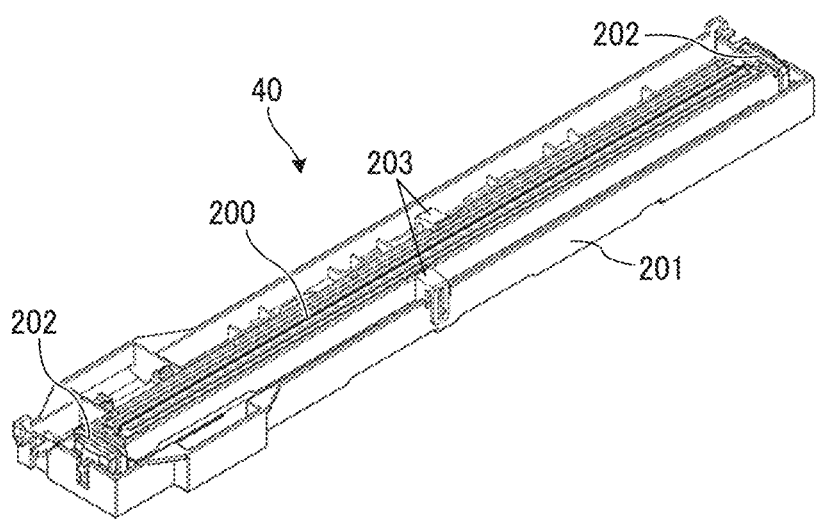
FIG. 3 is a diagram illustrating a schematic configuration of an optical scanner unit, according to an embodiment of the present disclosure.

FIG. 3 is a diagram illustrating a schematic configuration of an optical scanner unit 40, according to the present embodiment.

The optical scanner unit 40 according to the present embodiment is provided with a contact image sensor (CIS) 200, a carriage 201 that holds the contact image sensor 200 in a movable manner in the sub-scanning direction, a pair of end sliders 202 that are arranged on both ends of the plane facing a reading face in the longer-side direction, and a pair of central sliders 203 arranged in the center of the longer-side direction. The pair of central sliders 203 are arranged on both the right and left sides of the contact image sensor 200 in the moving direction indicated by an arrow B in FIG. 2.

The optical scanner unit 40 according to the present embodiment is pressed against a contact glass that serves as a reading face by a spring provided for the carriage 201. As the end slider 202 that serves as an end slide shoe contacts the contact glass, the relative position of the contact image sensor 200 can accurately be determined, and the scanning operation can be performed smoothly.

Due to the pair of central sliders 203 each of which serves as a central slide shoe, a certain degree of clearance is arranged between the optical scanner unit 40 and the contact glass.

As the mechanisms to move the carriage 201, the optical scanner unit 40 according to the present embodiment includes, for example, a guide rod, a bearing that engages with the guide rod, a timing belt that conveys the driving power of a motor that serves as a driving source.

A pair of central sliders 203 are described below with reference to FIG. 4A, FIG. 4B, FIG. 4C, and FIG. 4D.

Figure 4A:
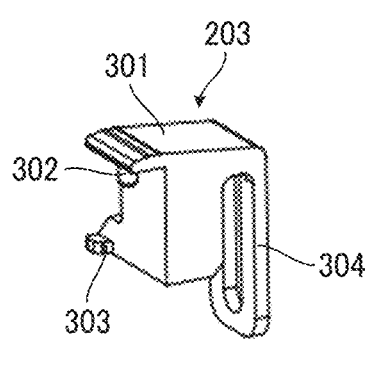
FIG. 4A is a perspective view of a pair of central sliders according to an embodiment of the present disclosure.
Figure 4B:
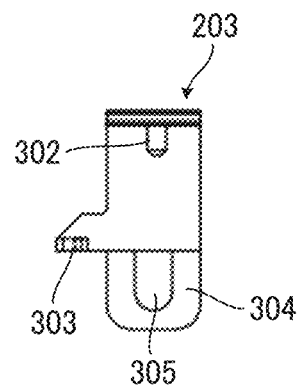
FIG. 4B, FIG. 4C, and FIG. 4D are side views of the pair of central sliders according to an embodiment of the present disclosure.
Figure 4C:
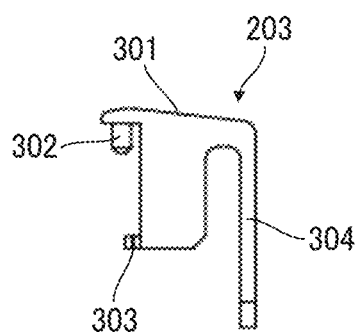
Figure 4D:
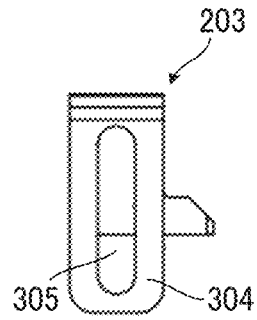

FIG. 4A is a perspective view of one of the pair of central sliders 203 according to the present embodiment, and FIG. 4B and FIG. 4D are front and rear side views of one of the pair of central sliders 203 attached to the optical scanner unit 40, in the shorter-side direction, according to the present embodiment. FIG. 4C is a side view of one of the pair of central sliders 203 attached to the optical scanner unit 40, in the longer-side direction, according to the present embodiment.

A mode in which a pair of central sliders 203 are attached to the optical scanner unit 40 is described below with reference to FIG. 5A and FIG. 5B.

As illustrated in FIG. 4C, a pair of faces of the pair of central sliders 203 facing the contact glass that serves as the reading face are inclined downward with reference to the horizontal plane, and such inclined faces get lower toward the outside of the optical scanner unit 40. Such a face of one of the pair of central sliders 203 may be referred to as an inclined face 301 in the following description.

Figure 5A:
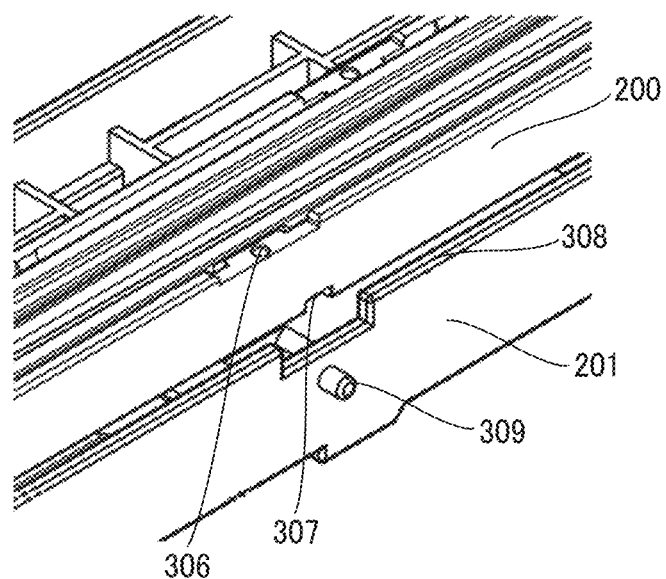
FIG. 5A and FIG. 5B are diagrams each illustrating how a pair of central sliders are attached to an optical scanner unit, according to an embodiment of the present disclosure.

As illustrated in FIG. 5A, the contact image sensor 200 of the optical scanner unit 40 has a pair of holes 306 and a pair of notches 307 around a pair of portions to which the pair of central sliders 203 are attached. As illustrated in FIG. 4A, FIG. 4B, FIG. 4C, and FIG. 4D, each one of the pair of central sliders 203 according to the present embodiment has a boss 302 that engages with the hole 306, and a claw-shaped portion 303 that engages with the notch 307.

A state in which the pair of central sliders 203 are attached to the optical scanner unit 40 is described with reference to FIG. 5B. The pair of central sliders 203 are fixed onto the optical scanner unit 40 upon determining the relative positions of the pair of central sliders 203 in the horizontal direction by the boss 302 and the claw-shaped portion 303.

Each one of the pair of central sliders 203 has an extending portion 304 that extends outside the carriage 201 and is bent downward at an end of the extension. The inner surface of the bent portion of the extending portion 304 contacts the outer surface of a frame 308 of the carriage 201.

Figure 5B:
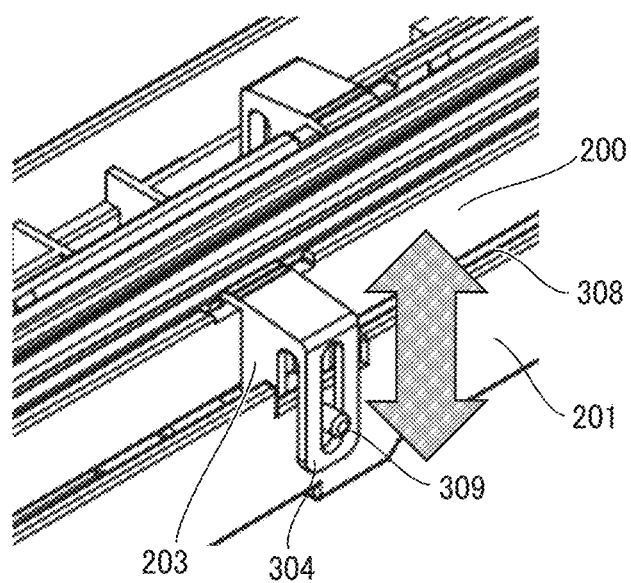

As illustrated in FIG. 5B, the pair of central sliders 203 are attached to the optical scanner unit 40, but can slide in the up-and-down directions. For example, when the inclined faces 301 of the pair of central sliders 203 facing the contact glasses that serve as the reading faces are pressurized, the pair of central sliders 203 can be displaced in the pressed direction.

The carriage 201 has a convex portion 309 on an outer surface of the frame 308, and the extending portions 304 of the pair of central sliders 203 has a duct 305 that slidably engages with the convex portion 309.

FIG. 6, FIG. 7, FIG. 8A, and FIG. 8B are schematic diagrams each illustrating a state in which the optical scanner unit 40 is at a home position (HP) before the scanning operation starts.

In the image reading apparatus according to the present embodiment, when the optical scanner unit 40 is at a home position (HP) before the scanning operation starts, one of the pair of central sliders 203 is at a position that overlaps with the for-still-document contact glass 7 when viewed in the vertical direction.

In other words, when the optical scanner unit 40 is at the home position (HP), at least some of the pair of faces of the pair of central sliders 203 facing the reading face goes underneath the end 7a of the for-still-document contact glass 7.

When the optical scanner unit 40 is at a home position (HP) before the scanning operation starts, it is desired that one of the pair of central sliders 203 closer to the for-still-document contact glass 7 than the other one of the pair of central sliders 203 be at a position to overlap with both of the for-still-document contact glass 7 and the for-moving-document contact glass 104 when viewed in the vertical direction.

The image reading apparatus according to the present embodiment is especially advantageous when the level difference between the end 7a of the for-still-document contact glass 7 and an end of the for-moving-document contact glass 104 is within the range of acceleration by the driving source that drives the optical scanner unit 40 to perform scanning. A shock of the collision of the optical scanner unit 40 that accelerates after the movement starts with a step portion can be avoided, and the damage to the parts or out-of-step due to an excessive load on the motor can be prevented.

Figure 6:
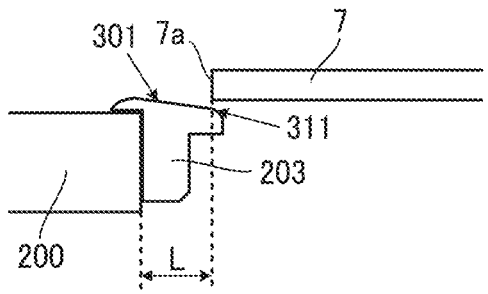
FIG. 6 is a diagram illustrating the clearance in the horizontal direction between an end of a contact image sensor (CIS) and an end of a for-still-document contact glass, according to an embodiment of the present disclosure.

FIG. 6 is a diagram illustrating the clearance L in the horizontal direction between an end of the contact image sensor 200 and an end 7a of the for-still-document contact glass 7, according to the present embodiment.

In the present embodiment, when the optical scanner unit 40 is at a home position (HP) before the scanning operation starts, the clearance L in the horizontal direction between an end of the contact image sensor 200, which is a front portion in the scanning direction, and an end 7a of the for-still-document contact glass 7 is preferably shorter than the length of one of the pair of inclined face 301 of the pair of central sliders 203 facing the reading face in the horizontal direction.

When the clearance L between an end of the contact image sensor 200 and an end 7a of the for-still-document contact glass 7 is relatively large, the arrangement in which at least one of the inclined faces 301 of the pair of central sliders 203 goes underneath the for-still-document contact glass 7 causes the end 7a of the for-still-document contact glass 7, which is displaced downward due to the bending, to contact an end 311 of the inclined face 301, and there is some concern that the posture or attitude of the contact image sensor 200 becomes unstable under the influence of the moment.

When the inclined faces 301 of the pair of central sliders 203 is made so long and goes underneath the for-still-document contact glass 7 exceeding the end 7a of the for-still-document contact glass 7, there is some concern that high stability cannot be achieved if the extending portion 304 is not arranged as illustrated in FIG. 6.

In order to deal with such a situation, as illustrated in FIG. 4A, FIG. 4B, FIG. 4C, FIG. 4D, FIG. 5A, and FIG. 5B, the pair of central sliders 203 are fixed onto the optical scanner unit 40 upon determining the relative positions of the pair of central sliders 203 in the horizontal direction by the boss 302 and the claw-shaped portion 303.

Moreover, in the present embodiment, the pair of central sliders 203 are supported by the carriage 201 through the extending portion 304, and the provision of the duct 305 that slidably engages with the convex portion 309 arranged on the carriage 201 enables the displacement in the up-and-down directions. Due to such configurations as described above, the posture or attitude of the attached contact image sensor 200 can be maintained at a constant degree with high stability.

Figure 7:
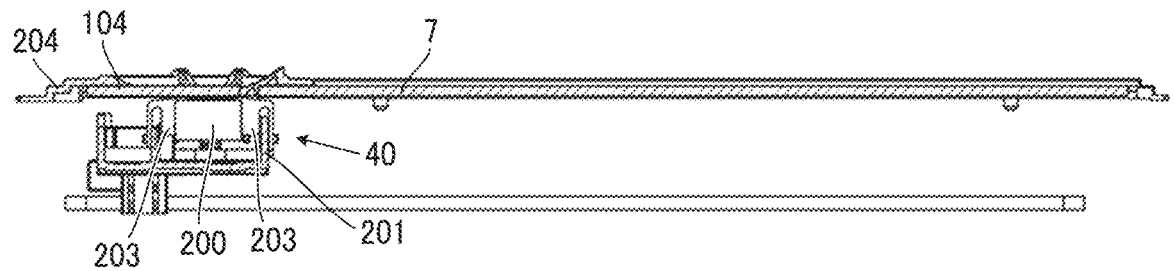
FIG. 7 is a schematic X-X sectional view of the scanner of FIG. 2.

FIG. 7 is an X-X sectional view of the scanner 4 of FIG. 2, and illustrates the reading face and the optical scanner unit 40.

Figure 8A:
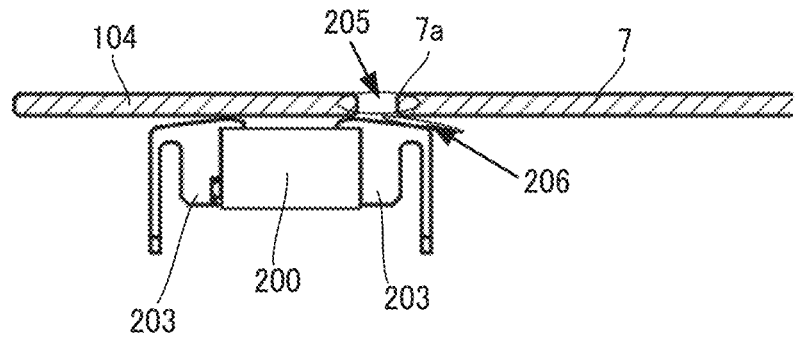
FIG. 8A and FIG. 8B are partial magnified views of the X-X sectional view in FIG. 7, where
Figure 8B:
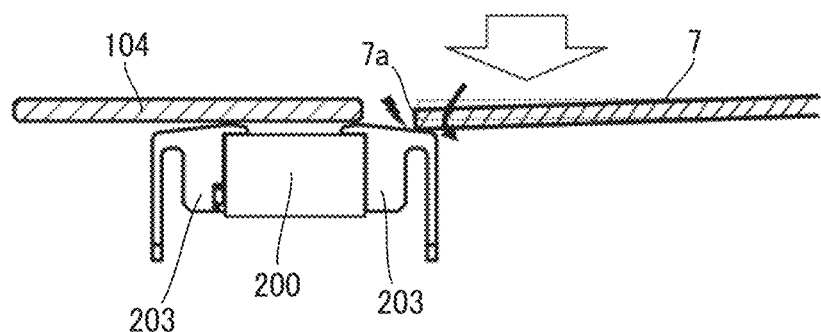

FIG. 8A and FIG. 8B are partial magnified views of the X-X sectional view in FIG. 7. More specifically, FIG. 8A illustrates a case in which there is no step on the reading face, and FIG. 8B illustrates a case in which there is a step on the reading face.

FIG. 2 is a schematic diagram of the image reading apparatus according to the present embodiment, which is the scanner 4 provided for the image forming apparatus of FIG. 1.

As illustrated in FIG. 2, in the image reading apparatus according to the present embodiment, the for-still-document contact glass 7 and the for-moving-document contact glass 104 are attached to a resin frame 204. A method of attaching the for-still-document contact glass 7 and the for-moving-document contact glass 104 to a resin frame 204 is not limited to any particular method, and may be for example, a pasting method using, for example, a double-sided adhesive tape. As the for-still-document contact glass 7 and the for-moving-document contact glass 104 are separate members, a step tends to appear between a pair of ends of those members in the sub-scanning direction.

As illustrated in FIG. 8A, when the for-still-document contact glass 7 is not curved, the clearance 206 is arranged between the for-still-document contact glass 7 and the inclined faces 301 of the pair of central sliders 203, and the inclined face 301 does not contact the for-still-document contact glass 7.

By contrast, as illustrated in FIG. 8B, for example, when a document of heavy weight is placed or when the document is pressed against the contact glass, the for-still-document contact glass 7 is curved, and the end is displaced downward. Accordingly, the inclined faces 301 of the pair of central sliders 203 are pressed against the end 7a of the for-still-document contact glass 7. When at least one of the inclined faces 301 of the pair of central sliders 203 is pressed by the for-still-document contact glass 7, the pair of central sliders 203 is displaced downward as pressed.

As described above, with the configuration or structure illustrated in FIG. 4A, FIG. 4B, FIG. 4C, FIG. 4D, FIG. 5A, and FIG. 5B, the pair of central sliders 203 are supported by both the contact image sensor 200 and the carriage 201. Accordingly, the pair of central sliders 203 can be displaced in the up-and-down directions while maintaining the position in the horizontal direction.

Due to such a configuration, even if at least one of the pair of central sliders 203 contacts the end 7a of the for-still-document contact glass 7 that deforms and makes a step while the optical scanner unit 40 is moving, the pair of central sliders 203 can pass while sliding smoothly. Accordingly, the movement of the pair of central sliders 203 is not interrupted even within the range of acceleration by a driving source, and the damage to the parts due to the impact of the collision or out-of-step due to an excessive load on the motor can be prevented. With the provision of the pair of central sliders 203, the distance between the for-still-document contact glass 7 and the contact image sensor 200 does not change suddenly, and the focal point does not change significantly. Accordingly, the modulation transfer function (MTF) that indicates the contrast reproducibility can be prevented from decreasing.

In the above embodiments of the present disclosure, the pair of faces of the pair of central sliders 203 that face the for-still-document contact glass 7 are the inclined faces 301. However, no limitation is intended thereby, and the pair of faces that face the for-still-document contact glass 7 may be flat.

Note that numerous additional modifications and variations are possible in light of the above teachings. It is therefore to be understood that within the scope of the appended claims, the embodiments of the present disclosure may be practiced otherwise than as specifically described herein. For example, elements and/or features of different illustrative embodiments may be combined with each other and/or substituted for each other within the scope of this disclosure and appended claims.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field-programmable gate array (FPGA), and conventional circuit components arranged to perform the recited functions.

What is claimed is:

1. An image reading apparatus comprising:
a for-still-document contact glass configured to serve as a reading face for a placed document;
a for-moving-document contact glass configured to serve as a reading face for a document conveyed by an automatic document feeder; and
an optical scanner unit configured to move in a scanning range of the for-still-document contact glass back and forth in a sub-scanning direction to scan the document, the optical scanner unit being configured to move to a scanning range of the for-moving-document contact glass and scan the document in a static manner in response to the document being conveyed in an automatic manner, the optical scanner unit including a contact image sensor, a carriage holding the contact image sensor in a movable manner in the sub-scanning direction, a pair of end sliders on both ends of a plane facing the reading face in a longer-side direction of the optical scanner unit, and a pair of central sliders at a center of longer-side direction, the pair of central sliders being on both right and left sides of the contact image sensor in a moving direction of the optical scanner unit, wherein, when the optical scanner unit is at a home position before scanning operation starts, one of the pair of central sliders is at a position overlapping with the for-still-document contact glass when viewed in a vertical direction of the optical scanner unit, and one of the pair of central sliders closer to the for-still-document contact glasses than another one of the pair of central sliders is at a position overlapping with both the for-still-document contact glass and the for-moving-document contact glass when viewed in the vertical direction.

2. The image reading apparatus according to claim 1, wherein, when the optical scanner unit is at a home position before scanning operation starts, clearance in a horizontal direction between a front end of the contact image sensor in a scanning direction and an end of the for-still-document contact glass is shorter than length of a pair of faces of the pair of central sliders facing the reading face in a horizontal direction.

3. The image reading apparatus according to claim 1, wherein a pair of faces of the pair of central sliders facing the reading face are inclined downward with reference to a horizontal plane, and the pair of faces get lower toward outside of the optical scanner unit.

4. The image reading apparatus according to claim 1, wherein the contact image sensor includes a pair of holes and a pair of notches at a pair of portions to which the pair of central sliders are attached, wherein each one of the pair of central sliders has a boss engaging with one of the pair of holes and a claw-shaped portion engaging with one of the pair of notches, and wherein the pair of central sliders are configured to be fixed to the optical scanner unit upon determining relative positions of the pair of central sliders in a horizontal direction by the boss and the claw-shaped portion.

5. The image reading apparatus according to claim 1, wherein the pair of central sliders are displaced in a direction in which the pair of faces are pressurized in response to a pair of faces of the pair of central sliders facing the reading face being pressurized.

6. The image reading apparatus according to claim 1, wherein the pair of central sliders includes an extending portion extending outside the carriage and being bent downward at an end of extension, and wherein the extending portion has a bent inner surface contacting an outer surface of a frame of the carriage.

7. The image reading apparatus according to claim 6, wherein the carriage includes a convex portion on an outer surface of the frame, and wherein the extending portion of each one of the pair of central sliders has a duct configured to slidably engage with the convex portion.

8. The image reading apparatus according to claim 1, wherein a level difference between an end of the for-still-document contact glass and an end of the for-moving-document contact glass is within a range of acceleration of the optical scanner caused by a driving source to perform scanning.

9. An image forming apparatus comprising
the image reading apparatus according to claim 1.

10. An image reading apparatus comprising:
a for-still-document contact glass configured to serve as a reading face for a placed document;
a for-moving-document contact glass configured to serve as a reading face for a document conveyed by an automatic document feeder; and
an optical scanner unit configured to move in a scanning range of the for-still-document contact glass back and forth in a sub-scanning direction to scan the document, the optical scanner unit being configured to move to a scanning range of the for-moving-document contact glass and scan the document in a static manner in response to the document being conveyed in an automatic manner, the optical scanner unit including a contact image sensor, a carriage holding the contact image sensor in a movable manner in the sub-scanning direction, a pair of end sliders on both ends of a plane facing the reading face in a longer-side direction of the optical scanner unit, and a pair of central sliders at a center of longer-side direction, the pair of central sliders being on both right and left sides of the contact image sensor in a moving direction of the optical scanner unit, wherein, when the optical scanner unit is at a home position before scanning operation starts, one of the pair of central sliders is at a position overlapping with the for-still-document contact glass when viewed in a vertical direction of the optical scanner unit, and clearance in a horizontal direction between a front end of the contact image sensor in a scanning direction and an end of the for-still-document contact glass is shorter than length of a pair of faces of the pair of central sliders facing the reading face in a horizontal direction.

11. An image reading apparatus comprising:
a for-still-document contact glass configured to serve as a reading face for a placed document;
a for-moving-document contact glass configured to serve as a reading face for a document conveyed by an automatic document feeder; and
an optical scanner unit configured to move in a scanning range of the for-still-document contact glass back and forth in a sub-scanning direction to scan the document, the optical scanner unit being configured to move to a scanning range of the for-moving-document contact glass and scan the document in a static manner in response to the document being conveyed in an automatic manner, the optical scanner unit including a contact image sensor, a carriage holding the contact image sensor in a movable manner in the sub-scanning direction, a pair of end sliders on both ends of a plane facing the reading face in a longer-side direction of the optical scanner unit, and a pair of central sliders at a center of longer-side direction, the pair of central sliders being on both right and left sides of the contact image sensor in a moving direction of the optical scanner unit, wherein, when the optical scanner unit is at a home position before scanning operation starts, one of the pair of central sliders is at a position overlapping with the for-still-document contact glass when viewed in a vertical direction of the optical scanner unit, and wherein the pair of central sliders are displaced in a direction in which the pair of faces are pressurized in response to a pair of faces of the pair of central sliders facing the reading face being pressurized.

* * * * *